US009227746B2

(12) United States Patent
Biel et al.

(10) Patent No.: US 9,227,746 B2
(45) Date of Patent: Jan. 5, 2016

(54) METHOD AND APPARATUS FOR MANUFACTURING OPHTHALMIC LENSES

(75) Inventors: Roger Biel, Aschaffenburg (DE); Peter Hagmann, Erlenbach am Main (DE); Günter Lässig, Obernburg (DE)

(73) Assignee: Novartis AG, Basel (CH)

( * ) Notice: Subject to any disclaimer, the term of this patent is extended or adjusted under 35 U.S.C. 154(b) by 1030 days.

(21) Appl. No.: 11/823,076

(22) Filed: Jun. 26, 2007

(65) Prior Publication Data

US 2007/0296097 A1    Dec. 27, 2007

(30) Foreign Application Priority Data

Jun. 26, 2006    (EP) .................................... 06013096

(51) Int. Cl.
*B29D 11/00*    (2006.01)
*B65B 25/00*    (2006.01)

(52) U.S. Cl.
CPC .......... *B65B 25/008* (2013.01); *B29D 11/0025* (2013.01); *B29D 11/00067* (2013.01); *B29D 11/00125* (2013.01); *Y10S 134/901* (2013.01)

(58) Field of Classification Search
USPC .................................................. 264/2.5, 1.1
See application file for complete search history.

(56) References Cited

U.S. PATENT DOCUMENTS

| 5,690,866 | A  | * | 11/1997 | Andersen et al. | 264/2.6 |
| 6,207,086 | B1 | * | 3/2001  | Schlagel et al. | 264/2.6 |
| 6,581,761 | B1 | * | 6/2003  | Stafford et al. | 206/5.1 |
| 6,609,041 | B1 | * | 8/2003  | Sanka et al.    | 700/115 |
| 2004/0004750 | A1 | * | 1/2004 | Stevenson et al. | 359/228 |

FOREIGN PATENT DOCUMENTS

| EP | 1 052 084 | 11/2000 |
| WO | WO 98/42497 | 10/1998 |
| WO | WO 02/14058 | 2/2002 |
| WO | WO 2005011966 A1 * | 2/2005 |

OTHER PUBLICATIONS

U.S. Appl. No. 60/142,159.*
PCT International Search Report.
PCT Written Opinion of the International Searching Authority.

* cited by examiner

*Primary Examiner* — Atul P. Khare
(74) *Attorney, Agent, or Firm* — Sheng-Hsin Hu

(57) ABSTRACT

A method for manufacturing ophthalmic lenses, e.g. contact lenses, in particular soft contact lenses, comprises the steps of molding in a high volume manufacturing process a plurality of lenses (CL) having different properties, and transferring the respective molded lenses (CL) that have the same properties to a respective intermediate buffer (1;1a) so as to store therein a bulk of lenses (CL) having the same properties.

13 Claims, 5 Drawing Sheets

METHOD AND APPARATUS FOR MANUFACTURING OPHTHALMIC LENSES

Figure 1:
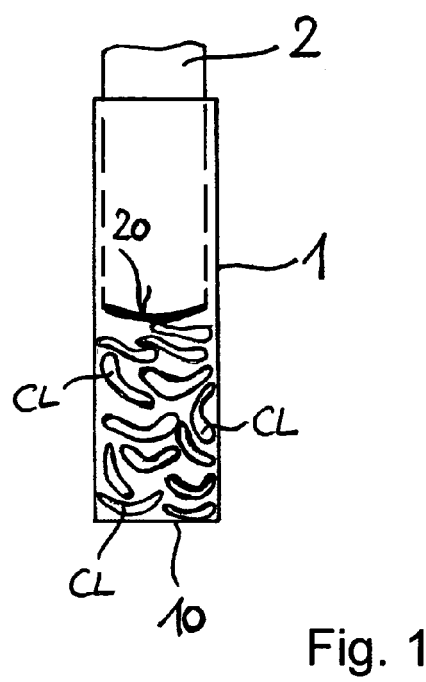

This application claims benefit under 35 USC §119 of European patent application No. EP 06013096.0 filed Jun. 26, 2006, the contents of which are incorporated herein by reference.

This invention relates to a method and an apparatus for manufacturing ophthalmic lenses, e.g. contact lenses, in particular soft contact lenses.

Contact lenses and in particular soft contact lenses such as single wear lenses are efficiently manufactured in high volume manufacturing processes. One such process is described, for example, in WO 98/42497. The process described there is a cyclic process. Since the contact lenses must be of high quality, reusable molds of a particular high quality (e.g. made from quartz) are used, so that a high number of contact lenses is produced using the high quality reusable molds. Each mold comprises a male mold half and a female mold half. In the example of the process shown in WO 98/42497, the molds are arranged in a molding tool which comprises two tool halves, with each of the tool halves housing ten reusable male or female mold halves, respectively. During manufacturing of contact lenses, a metered quantity of liquid prepolymer is dispensed into each of the female mold halves, and the molds are then closed by moving the tool half housing the male mold halves towards the tool half housing the female mold halves. Upon closing the molding tool, the liquid prepolymer enclosed between the corresponding mold halves of the ten molds assumes the shape of the contact lens. The prepolymer is then cross-linked and/or polymerized, e.g. through exposure of the prepolymer to UV-radiation so as to form the final contact lens. In the cyclic process shown in WO 98/42497, a plurality of molding tools each housing ten molds are used in the process. In order to simplify matters, it is assumed in the following that sixteen molding tools are used in the cyclic process, although other numbers of molding tools, in particular higher numbers, can be used. When the contact lenses have been produced, they are taken out from the molds and are inspected so as to determine whether or not the molded lenses fulfill the high quality requirements.

Each contact lens that has been found to be acceptable is transferred to a packaging station, where it is placed into a separate contact lens container, to which saline or another suitable preserving solution has been added. The container containing the contact lens is then sealed, e.g. by placing a foil on top of the container and sealing the foil to the container.

A container suitable for accommodating a contact lens to be packaged is shown, for example, in EP 0 680 895. Also, it is shown there that an arrangement of a plurality of such containers can be provided in a packaging station. In particular, five such containers may be arranged in a row. Once a contact lens has been placed into each of the five containers of the row, a detection process can be initiated detecting the presence (or absence) of a contact lens in each of the containers. One way how such detection process can be performed is described, for example, in EP 1 109 011. If it has been determined that a contact lens is contained in each of the containers, a foil extending over all containers of the row is placed on top of the containers and is then sealed (thermally bonded) to the containers. The thermal bonding of the foil to the containers can be performed, for example, in the manner described in WO 98/32587. The foil can then be marked by means of a laser, the markings containing indications regarding the properties of the lens contained in the containers (e.g. base curve radius, diameter, optical power, type of contact lens e.g. spherical or toric, etc.). One way how such laser marking can be performed is described, for example, in WO 00/05078.

Both the high volume manufacturing of contact lenses as well as the described packaging process are well-established and well-working processes. However, in high volume manufacturing (mass production) of contact lenses seasoning effects occur after the molds have been changed and manufacturing is getting started. That is to say, it is necessary to run the manufacturing line for a certain time to ensure the constant high quality of the contact lenses manufactured, i.e. to eliminate seasoning effects. This is one reason—among others—why an efficient high volume manufacturing line needs to run for considerable time after the seasoning effects have been eliminated.

The manufactured lenses having the high quality are transferred—after inspection—to the containers provided in a packaging station. Assuming that in one manufacturing line the above-described molding tools are used each of which houses ten molds, and further assuming that in the manufacturing line a total of sixteen molding tools are used, it is generally possible with one manufacturing line to manufacture hundred and sixty contact lenses having different properties (counted over all sixteen molding tools).

In the packaging station each container of a row of e.g. five containers must contain a contact lens having the same properties as the contact lenses contained in the other containers of the same row, since the containers of a row are connected to one another (through the foil or otherwise) and are sold as a unit of five containers. It does not make any sense to provide a row of containers connected to one another when the contact lenses in the containers of a row have properties different from one another, since the customers always need contact lenses having the same properties for one eye. As a consequence, if hundred and sixty different contact lenses were produced in one manufacturing cycle and for each type of contact lens a separate row of containers must be provided in the packaging station, this would require that hundred and sixty rows of containers be provided in the packaging station so as to be able to transfer the respective contact lenses to the containers of a row in which all contact lenses contained in the containers of the row have the same properties. Needless to say, that this would require an extremely large space and is therefore impractical.

In addition, in the above-described process the lenses are always transported from the same predetermined positions, e.g. from the positions in which they have been taken out from the mold halves or from the positions in which they have been inspected, to other predetermined positions, e.g. to the inspection positions or to the positions in the packaging station where the respective containers for packaging are provided. This is advantageous inasmuch as the expense for the position control can be kept comparatively low.

Contact lenses having properties (e.g. base curve radius, diameter, optical power, etc.) which are within a certain range are requested in higher numbers by the market than contact lenses outside this range. This is so, because the geometries of the eyes of a large part of the users of contact lenses can be described by parameters which are within a certain range ("conventional" range). However, even for the other users whose eyes have a geometry the parameters of which are outside this range, the advantages of mass production should be available, e.g. in order to be able to efficiently supply those users with single wear lenses, since during manufacturing of these contact lenses the seasoning effects occur, too, and accordingly for these lenses the manufacturing process has to run for a certain time until contact lenses of constant high quality are produced, so that mass production of such lenses is only efficient if the manufacturing line can run for considerable time after the seasoning effects have been eliminated.

Summing up, the advantages of mass production of contact lenses should be available for a large number of contact lenses having different properties in order to efficiently produce single wear lenses regardless of the properties of the lenses, so that in particular also users who are in need of single wear contact lenses having properties outside the "conventional" range can be supplied with single wear contact lenses. At the same time, the expense for the position control as well as for the packaging station should be kept comparatively small. However, this requirement is contrary to the requirement of producing a large number of contact lenses with different properties in the same manufacturing line without the need to change molds, restart the manufacturing process and run the manufacturing line for a certain time until the seasoning effects are eliminated.

The present invention, as it is characterized by the features of the independent claims, solves this problem, the general concept underlying the invention being to decouple the lens manufacturing process (mass production) from the inspection process or the packaging process, respectively. In the following description of embodiments, lens manufacturing refers to the manufacturing of single wear soft contact lenses, but this is by way of example only, since the teaching is generally applicable to the manufacture of other ophthalmic lenses, too. "Decoupling" in this respect means, that the manufacturing process and the inspection process and/or packaging process are decoupled both with respect to time and space. Advantageous variants of the process are characterized by the features of the dependent claims.

One advantage of the invention is, that the cycle time of the packaging process can be selected independent from the cycle time of the manufacturing process (in case cyclical processes are used). Previously, the cycle time of the coupled manufacturing and packaging process was determined by the slowest station in the contact lens manufacturing process. Also, it is generally conceivable that the contact lenses can be manufactured at one site, but lens inspection and/or packaging can be performed at another site, so that the contact lenses have to be shipped from one site to the other site. Also, if manufacturing and inspection and/or packaging are performed at the same site these processes can be performed at different locations of the site.

In addition, the expense for the position control can be kept comparatively low. For example, assuming that contact lens manufacturing is performed in a manufacturing line comprising sixteen different tools with each tool housing ten molds (see above), then the position control must only be programmed at the beginning of the manufacturing process in a manner such that the control knows for each of the sixteen tools and for each position within the respective tool what type of contact lens is manufactured at the specific position, and where the corresponding intermediate buffer is arranged. Once this programming has been performed, contact lenses having the same properties are always transferred with the aid of a suitable transfer means (e.g. a gripper) to the respective intermediate buffer, so that in one specific intermediate buffer a bulk of contact lenses all having the same properties are stored. Alternatively, tracking methods (e.g. using transponders) can be used to that the control always knows to which intermediate buffer the molded lens is to be transferred.

Moreover, due to the decoupling of the manufacturing process and the inspection and/or packaging process, the number of tracks where the rows of containers are arranged need not be changed. During contact lens packaging it is possible to take a plurality of contact lenses from the same buffer, transfer them to an isolation unit, isolate them in the isolation unit, and then grasp the isolated contact lenses having the same properties—one after another—and place the respective grasped isolated contact lens into a container of the respective row for packaging. Once five such contact lenses have been placed into the five containers arranged in a row (see above), the containers can be sealed, e.g. with the aid of a foil that is sealed to the top of the containers, as this has been described further above.

Also, the present invention allows to manufacture smaller lot sizes still using the well-established processes of mass production and the advantages resulting therefrom. This is advantageous inasmuch as also users who are in need of contact lenses the parameters of which are outside the "conventional" range (see above) can be supplied with single wear contact lenses, since the invention enables that such contact lenses can be effectively produced using high volume manufacturing processes (mass production) without the need to produce the very large lot sizes usually required to ensure that mass production of contact lenses is efficient. Rather, in accordance with the invention it is possible to produce comparatively small lot sizes with the well-established high quality known from mass production. As already mentioned above, although mass production of single wear soft contact lenses is referred to in this specification by way of example, the method according to the invention generally is applicable for the manufacture of lenses other than single wear soft contact lenses.

Figure 2:
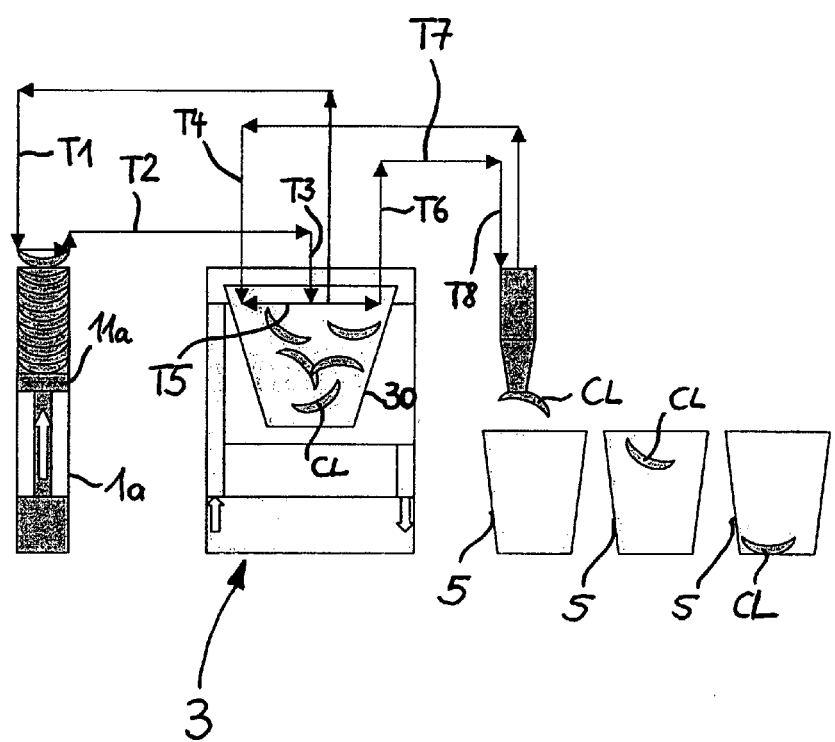
Figure 3:
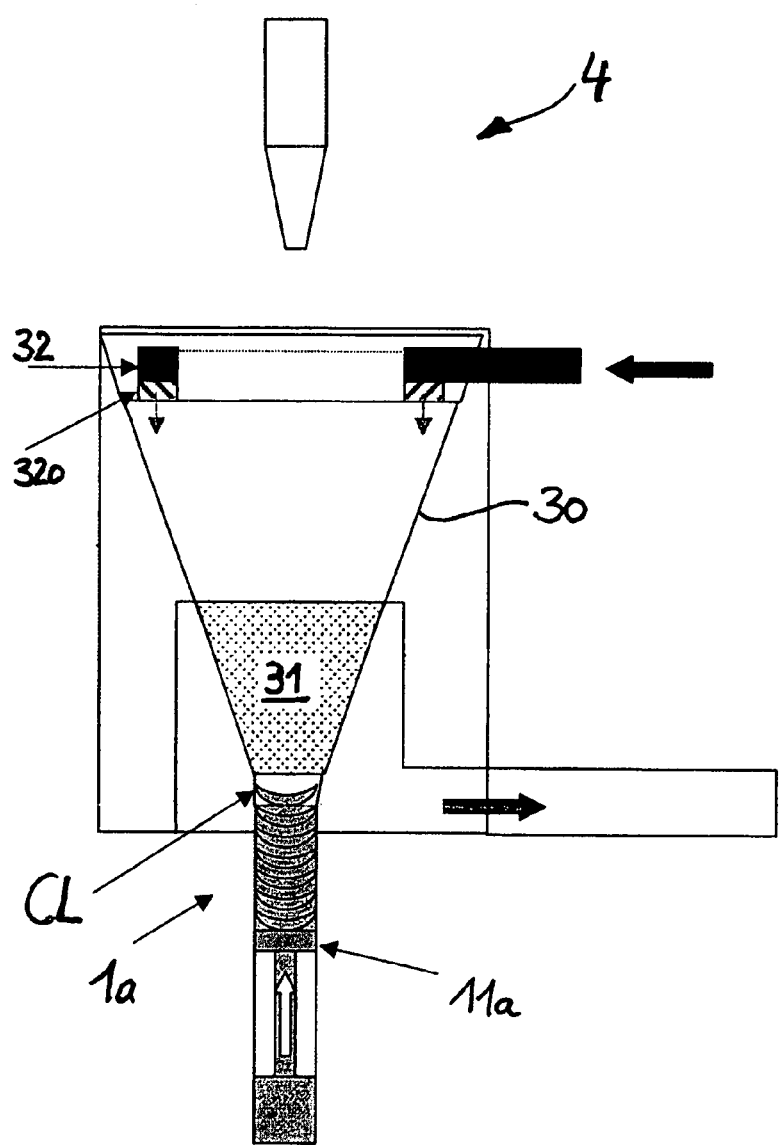
Figure 4:
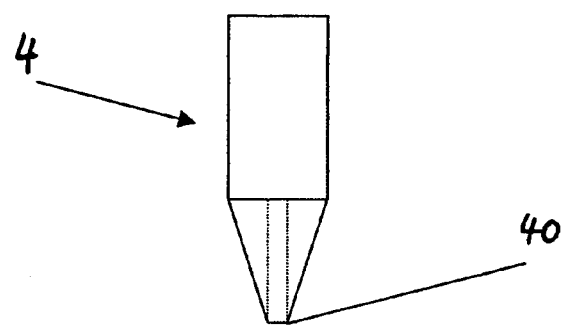
Figure 5:
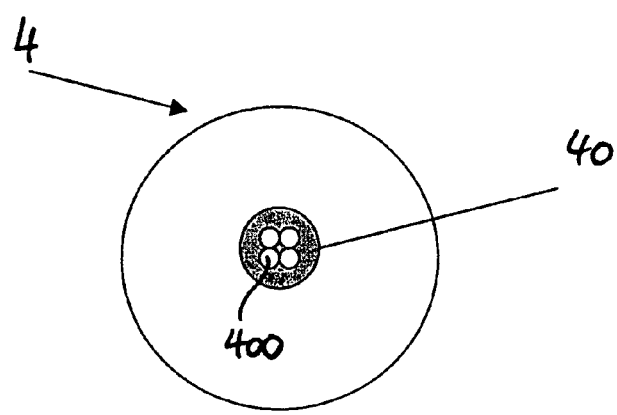
Figure 6:
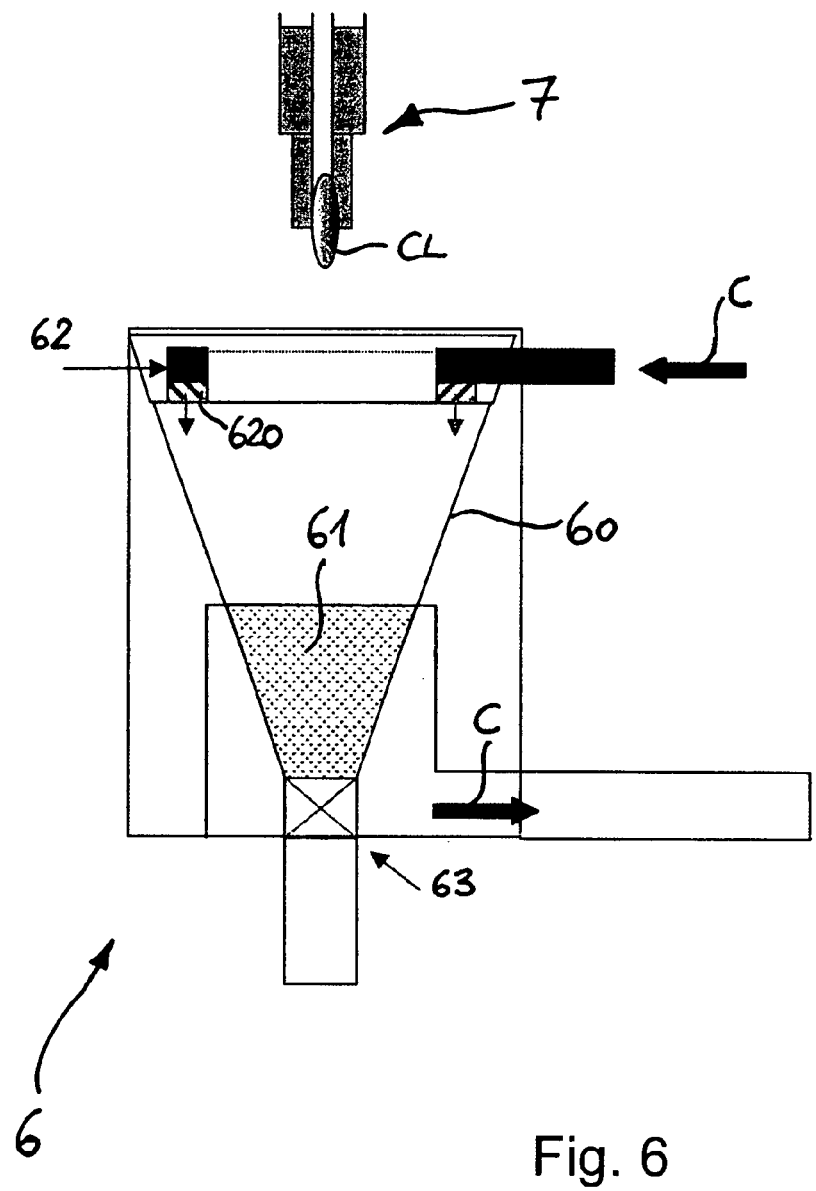

Further advantageous aspects of the invention can be retrieved from the following description of exemplary embodiments of the invention with the aid of the drawings, in which:

FIG. 1 shows a first embodiment of an intermediate buffer of the method according to the invention, FIG. 2 a schematic overview of a first variant of the step of transferring a plurality of lenses from a second embodiment of an intermediate buffer to a lens isolation unit and for transferring isolated lenses from the lens isolation unit to respective inspection cuvettes FIG. 3 a second variant of the step of transferring the lenses from the second embodiment of the intermediate buffer to the lens isolation unit FIG. 4 an embodiment of the gripper for grasping an isolated lens from the lens isolation unit FIG. 5 a bottom view of the gripper of FIG. 4, and FIG. 6 an embodiment of a lens cleaning unit that may be arranged at the inlet of an intermediate buffer.

In accordance with the invention, soft contact lenses are manufactured in a known high volume manufacturing process (mass production), as it is shown for example in WO 98/42497 already mentioned above. However, contrary to the known manufacturing processes, a large number of different types of soft contact lenses, that is to say soft contact lenses having different properties (e.g. base curve radius, diameter, optical properties, etc.), can be produced in the process and still retaining the advantages resulting from mass production (see above). This is possible, since in contrast to the known manufacturing lines and processes for mass production, prior to packaging (or even prior to inspection) the molded soft contact lenses are transferred to respective intermediate buffers, with one intermediate buffer always containing only soft contact lenses all having the same properties. This requires that the control of the manufacturing line necessarily must know for each mold in the manufacturing process the properties of the lens molded therein. This can be inputted to the control of the manufacturing line before starting the manufacturing process, or can be tracked by any suitable means (e.g. with the aid of transponders), so that the control always knows which molded lens is to be transferred to which intermediate buffer. The intermediate buffer may contain a preserving liquid, e.g. water or saline, so that the soft contact lenses can be stored therein.

FIG. 1 shows a first embodiment of an intermediate buffer as it may be used in the method according to the invention. In this embodiment, the intermediate buffer comprises a tube-like container 1 which is closed at its bottom 10 and is open at its top. A bulk of molded soft contact lenses CL are stored in tube-like container 1—only a few of them are shown in FIG. 1 by way of example—all having the same properties (i.e. base curve radius, diameter, optical properties, etc.). In tube-like container 1 the soft contact lenses CL can be stored with comparatively high density (i.e. a large number of soft contact lenses can be stored in a comparatively small volume). As already mentioned, a suitable amount of a preserving liquid (not shown)—e.g. water or saline—is contained in tube-like container 1 so as to avoid that the molded soft contact lenses CL get dry during storage. Also, as the soft contact lenses CL are inserted into tube-like container 1 they are sinking downwardly and self-orient during sinking with their convex surface facing downwards. This simplifies the later grasping of the soft contact lenses CL in order to transfer them from tube-like container 1 for further processing. Furthermore, a gripper 2 having a large suction surface 20 is shown in FIG. 1. A "large" suction surface in this respect is meant to describe a surface through which suction is applied which has a diameter of at least 20%, preferably at least 50%, and even more preferably at least 80% of the diameter of one of the soft contact lenses to be grasped. Upon applying suction through "large" suction surface 20 a plurality of soft contact lenses CL can be grasped simultaneously by gripper 2 ("multi-lens gripper") and can be transferred to a lens isolation unit, as will be explained in more detail below.

In FIG. 2 a schematic overview of a first variant of the step of transferring a plurality of contact lenses from a second embodiment of an intermediate buffer to a lens isolation unit is shown. Also shown there is a variant of the step of transferring isolated contact lenses from the lens isolation unit to respective inspection cuvettes. In FIG. 2 the intermediate buffer comprises again a tube-like container 1a, however, the diameter of tube-like container 1a is chosen such that the soft contact lenses CL are stored therein one above the other. A piston 11a is movably arranged in tube-like container 1a so as to be able to move a plurality of soft contact lenses (a small column of soft contact lenses, e.g. four to ten soft contact lenses) to a position outside the container, here to a position above the upper edge of tube-like container 1a. In FIG. 2 only the uppermost soft contact lens CL is shown to have been moved to such position outside tube-like container 1a.

As has already been mentioned above, a gripper 2 having a large suction surface 20 (see FIG. 1) can be used to grasp the plurality of soft contact lenses CL. Regardless of whether the tube-like container 1 of FIG. 1 or the tube-like container 1a of FIG. 2 is used, gripper 2 is lowered so as to grasp a plurality of soft contact lenses CL, this action being represented through arrow T1. Suction is applied through suction surface 20 for that purpose, and a plurality of soft contact lenses CL is sucked against suction surface 20 of gripper 2.

The grasped soft contact lenses CL are then transferred to a lens isolation unit 3, this transfer being represented by arrows T2 and T3 (see FIG. 2). Pressure is now applied so as to release the plurality of soft contact lenses CL from suction surface 20 of gripper 2, the soft contact lenses thus having been definitively transferred into lens isolation unit 3. Gripper 2 is then returned to the position at tube-like container 1 or 1a, respectively, where it may grasp another plurality of soft contact lenses CL.

Lens isolation unit 3 comprises a conical container 30 in which a liquid, e.g. water, is contained. A whirled flow of liquid is generated within container 30 causing the plurality of soft contact lenses CL in container 30 to get separated (isolated) from one another. The liquid can be circulated within lens isolation unit 3, as is indicated by respective arrows C in FIG. 2.

An alternative variant of transferring the soft contact lenses from tube-like container 1a to lens isolation unit 3 is shown in FIG. 3. Here, tube-like container 1a is connected to an inlet which is provided at the bottom of conical container 30 of lens isolation unit 3. Also, a conical sieve 31 is arranged near the lower end of conical container 30. Again, a whirled flow of liquid is generated within conical container 30. The opening and closing of the inlet of conical container 30 can be performed by a suitable valve (not shown in FIG. 3) as it is well-known in the art. Tube-like container 1a containing the soft contact lenses CL is connected to the inlet and the movable piston 11a is moved upwards so as to move a plurality of soft contact lenses CL into the whirled liquid flow within conical container 30. The soft contact lenses CL that have thus been transferred to conical container 30 and get separated (isolated) from one another through exposure to the whirled flow of liquid, as this is also the case when the lenses have been transferred to conical container 30 with the aid of a gripper (see above). A nozzle ring 32 to which nozzles 320 are connected is arranged at the upper end of conical container 30. The liquid—e.g. water—is sprayed through nozzles 320 into container 30, and at the lower end liquid is drained and recirculated to nozzle ring 32 in order to be introduced into container 30 again through nozzles 320 (see respective arrows in FIG. 3). Any impurities that may have been introduced into the liquid are retained by sieve 31. Finally, in FIG. 3 a gripper 4 having a small suction surface is shown above conical container 30, which is described in more detail below.

The purpose of gripper 4 (see e.g. embodiment shown in FIG. 4 and FIG. 5) having a small suction surface 40 is to grasp only one of the isolated soft contact lenses CL ("single-lens gripper") in lens isolation unit and to transfer the grasped soft contact lens CL to an inspection cuvette 5, a plurality of which may be arranged at dedicated positions on a cuvette support (not shown). A "small" suction surface is meant to describe a surface through which suction is applied which has a diameter of at most 10%, preferably at most 5%, and even more preferably at most 1% of the diameter of one of the lenses to be grasped. Upon applying suction through "small" suction surface 40 only one single soft contact lens CL can be grasped by gripper 4, since once the openings 400 in "small" suction surface 40 are closed by a soft contact lens it is not possible that suction is applied through other openings in the suction surface 40 because the grasped contact lens covers all openings 400 in suction surface 40 due to the "small" dimensions of suction surface 40 relative to the grasped soft contact lens CL. While four suction openings 400 are shown in FIG. 5, also less than four openings may be provided in suction surface 40, e.g. one single opening.

Returning now to FIG. 2, once the soft contact lenses CL have been transferred to lens isolation unit 3 and have been isolated in the whirled flow of liquid in conical container 30 of lens isolation unit 3, gripper 4 having the small suction surface 40 is lowered into the liquid contained in conical container 30, as this is represented through arrow T4 in FIG. 2. Suction is applied through openings 400 in suction surface 40 and gripper 4 is moved through conical container 30, as this is represented through arrow T5 in FIG. 2. Once an isolated soft contact lens CL has been sucked against suction surface 40 and covers openings 400 of suction surface 40, gripper 4 is moved upwards as this is represented through arrow T6 in FIG. 2. Gripper 4 with the attached soft contact lens CL is then moved to an inspection cuvette 5, as this is represented through arrows T7 and T8. Once gripper 4 has reached the position of inspection cuvette 5, pressure is applied through the openings 400 in suction surface 40 of gripper 4 so as to release the soft contact lens CL from gripper 4 thus transferring it to inspection cuvette 5. Gripper 4 is then returned to isolation unit 3 in order to grasp the next soft contact lens CL and transfer it to the next inspection cuvette 5. Inspection cuvette 5 and the way it works is known per se and is described, for example, in WO 03/16855. Cuvette 5 contains liquid, e.g. water, and once soft contact lens CL is released from gripper 4 and has entered the liquid contained in cuvette 5, it starts to sink in the liquid thereby orienting itself with the convex surface facing downwards, as this is shown in FIG. 2.

FIG. 6 shows an embodiment of a lens cleaning unit that may be arranged at the inlet of the intermediate buffer, for example at the inlet of tube-like container 1 (see FIG. 1). Lens cleaning unit 6 looks somehow similar to lens isolation unit 3 (see FIG. 3). Lens isolation unit 6 comprises a conical container 60 in which a liquid, e.g. water, is contained. The liquid can be circulated within lens cleaning unit 6, as is indicated by respective arrows C in FIG. 6. Liquid, e.g. water, is introduced into conical container 60 through a nozzle ring 62 to which nozzles 620 are connected, and at the lower end liquid is drained and recirculated to nozzle ring 62 in order to be introduced into container 60 again through nozzles 620 (see respective arrows in FIG. 6). Any impurities that may have been introduced into the liquid are retained by sieve 61.

A soft contact lens manufactured in a high volume manufacturing line is transferred to lens cleaning unit 6, e.g. by means of a gripper 7. Gripper 7 may be embodied as a tweezers gripper or may be a suction-type gripper. In order to assist the transfer of soft contact lens CL from gripper 7 to container 60, the nozzles 620 of nozzle ring 62 can be used to direct a water jet to the respective soft contact lens CL adhering to gripper 7. For that purpose, gripper 7 can be moved to a suitable position. Once soft contact lens CL has been inserted into conical container 60, any residual prepolymer that may adhere to the soft contact lens is washed away in cleaning unit 6. Generation of a whirled flow of water within container 6 is generated for that purpose in the same manner as already explained above with respect to lens isolation unit 3.

Once the soft contact lens CL has been cleaned the introduction of further liquid through nozzle ring 62 is stopped while recirculation of liquid is continued. As a consequence, soft contact lens CL sinks downwardly towards a valve 63. At the time the cleaned soft contact lens CL has reached valve 63 and only a small amount of liquid is left within container 60, the recirculation flow is stopped and valve 63 is opened so that the remaining small amount of liquid is drained through valve 63 and draws soft contact lens CL through the open valve 63 through e.g. into tube-like container 1 shown in FIG. 1, which is then arranged beneath the container 60 of lens cleaning unit 6.

From the above discussion of the working principle of the process, it is clear that in a cyclic process gripper 4 having the small suction surface 40 must be able to always grasp one soft contact lens CL from container 30 of lens isolation unit within one clock cycle so as to be able to always transport one soft contact lens CL within one clock cycle to the inspection station (or, if so desired, to the packaging station). In order to make that sure, it is advantageous that a sufficient number of soft contact lenses CL (e.g. at least three lenses) is always present in container 30 of lens isolation unit 3.

Although it has been described in the embodiments, that a plurality of contact lenses CL is simultaneously transferred from the intermediate buffer to the lens isolation unit, this is not mandatory. It is also conceivable that the soft contact lenses be transferred one after the other, e.g. with the aid of a gripper having a small suction surface, similar to gripper 4. In this case, the liquid jet ejected from nozzles 320 of nozzle ring 32 may in particular assist in the release of the soft contact lens CL from the small suction surface of the gripper, as described above.

Also, it is conceivable that the contact lenses are cleaned or extracted during the time they are stored in the intermediate buffer. For example, once a bulk of manufactured contact lenses has been transferred into the intermediate buffer, e.g. into tube-like container 1, bottom 10 may comprise a sieve for retaining the contact lenses within tube-like container 1 and a valve, so that the valve can be opened thus draining the liquid from tube-like container 1. The valve can then be closed again, and a cleaning or extraction liquid can be filled into tube-like container. The lenses are then stored in tube-like container 1 for a predetermined time interval so as to complete cleaning or extraction at least to a predefined extent.

The invention claimed is:

1. A method for manufacturing contact lenses comprising the steps of:
    molding in a mass production process a plurality of lenses having different properties; and
    transferring the molded lenses that have the same properties to a respective intermediate buffer so as to store therein a bulk of lenses having the same properties, wherein the intermediate buffer comprises a tube-like container, wherein the diameter of tube-like container is chosen such that the lenses are stored therein one above the other, wherein the tube-like container is closed at one end and is open at the other end to allow for the storage of contact lenses with a suitable amount of preserving liquid contained therein to prevent the lenses from drying and to allow for the molded lenses to sink downwardly and self-orient during sinking with their convex surface facing downwards.

2. A method according to claim 1, further comprising the steps of:
    taking from the bulk of lenses stored in one of the intermediate buffer a plurality of lenses having the same properties;
    transferring the plurality of lenses to a lens isolation unit;
    isolating the lenses in the lens isolation unit; and
    grasping an isolated lens and taking it from the lens isolation unit for further processing.

3. A method according to claim 2, further comprising the step of:
    inspecting the lens taken from the lens isolation unit.

4. A method according to claim 3, further comprising the steps of:
    placing the inspected lens into a lens container for a single lens if the inspected lens has been found to be acceptable; and
    sealing the container.

5. A method according to claim 4, further comprising the step of cleaning the lenses in the intermediate buffer.

6. A method according to claim 4, further comprising the steps of:
    providing a plurality of lens containers arranged in a row;
    placing a lens into each of the lens containers of the row;

placing a foil on top of the lens containers, the foil extending over all containers arranged in the row; and sealing the foil to the containers.

7. A method according to claim 6, further comprising the step of cleaning the lenses in the intermediate buffer.

8. A method according to claim 2, further comprising the step of cleaning the lenses in the intermediate buffer.

9. A method according to claim 2, further comprising step of extracting the lenses in the intermediate buffer.

10. A method according to claim 1, further comprising the step of cleaning the lenses in the intermediate buffer.

11. A method according to claim 10, further comprising step of extracting the lenses in the intermediate buffer.

12. A method according to claim 1 further comprising step of extracting the lenses in the intermediate buffer.

13. A method according to claim 1, wherein the method comprises manufacturing in the mass production process a plurality of lenses of more than five different types with each type having properties different from another type.

\* \* \* \* \*